R. R. Miller,

Manf. Carriage Irons.

No. 100,783. Patented Mar. 15. 1870.

Witnesses.
Inventor.
Robt. R. Miller
by Prindle & Ager,
Attorneys.

United States Patent Office.

ROBERT R. MILLER, OF PLANTSVILLE, CONNECTICUT.

Letters Patent No. 100,783, dated March 15, 1870.

IMPROVED DIE FOR FORMING PERCH-PLATES.

The Schedule referred to in these Letters Patent and making part of the same.

*To all whom it may concern:*

Be it known that I, ROBERT R. MILLER, of Plantsville, in the county of Hartford, and in the State of Connecticut, have invented certain new and useful Improvements in Dies for Forming Perch-Plates; and do hereby declare that the following is a full, clear, and exact description thereof, reference being had to the accompanying drawing making a part of this specification, in which—

Letters of like name and kind refer to like parts in each of the figures.

Figure 2:
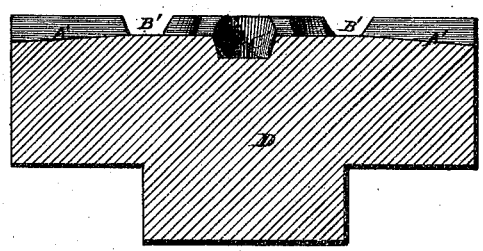
Figure 2 is a cross-section of the same, on the line $x\ x$ of fig. 1.
Figure 1:
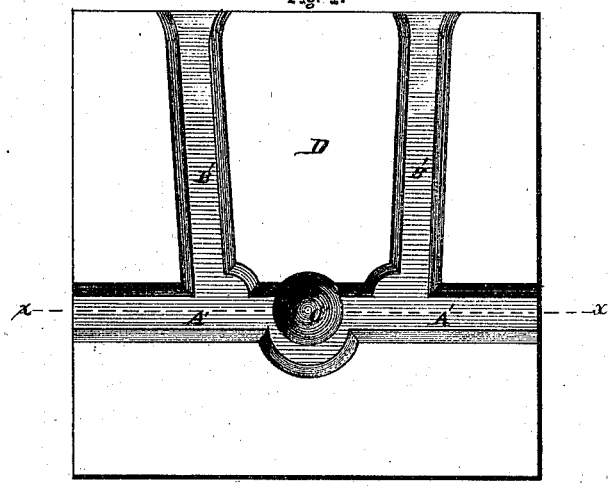
Figure 1 is a plan view of my improved die.
Figure 3:
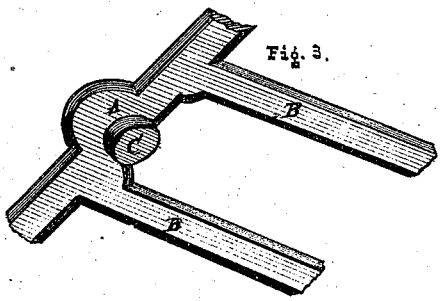
Figure 3 is a perspective view of the perch-plate as formed.

My invention has for its object the production of a perch-plate, that, while equal in form and workmanship to the most perfect hand-made article, shall be so readily constructed as to enable it to be furnished at a much less cost than has heretofore been possible; and to this end It consists in the employment of a peculiarly-constructed die for forming or shaping perch-plates, substantially as is hereinafter set forth.

In the manufacture of perch-plates by my method, the blank is roughly formed of a bar of metal, A, having welded to and extending laterally from one side thereof two arms, B, which are placed nearly at right angles to said bar A.

A round boss, C, secured to one side of the bar A, at its center, lengthwise, completes the blank, which is then ready for finishing. In order that the latter operation may be completed expeditiously, and perfect uniformity secured in the finished articles, I employ a steel die, D, having sunk within its face three grooves, A' B' and B', corresponding in size and shape with the bar A and arms B, when finished.

A circular recess, C', sunk below the bottom of the groove A, at its center, lengthwise, completes the die, which is used in the customary manner, the blank being heated to a suitable temperature, laid within the grooves, and caused to conform to and fill the same by means of a flat swage impinging against its upper surface.

As thus constructed and used, this die enables the operator to produce a perch-plate, perfect in all of its parts, in one-fourth the time that has heretofore been necessary, in addition to which the finished articles are entirely uniform in size and shape, and of a better quality than those produced by the ordinary means.

Having thus fully set forth the nature and merits of my invention,

What I claim as new, and desire to secure by Letters Patent, is—

The hereinbefore-described die D, provided with the grooves A' B' and B', and with the recess C', substantially as and for the purpose shown.

In testimony that I claim the foregoing I have hereunto set my hand this 2d day of February, 1870.

R. R. MILLER.

Witnesses:
HENRY R. BRADLEY,
CHAS. H. NEAL.